Nov. 3, 1936.    A. KARGES    2,059,359
FLOAT VALVE
Filed July 11, 1934
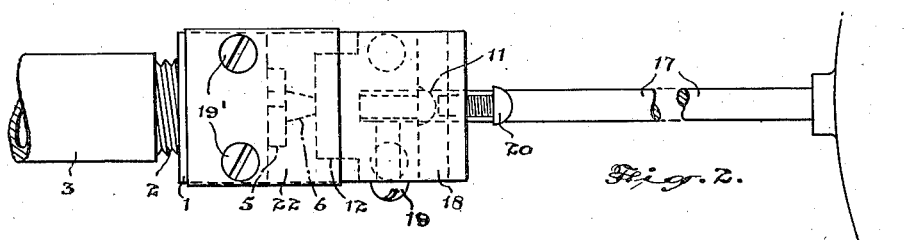
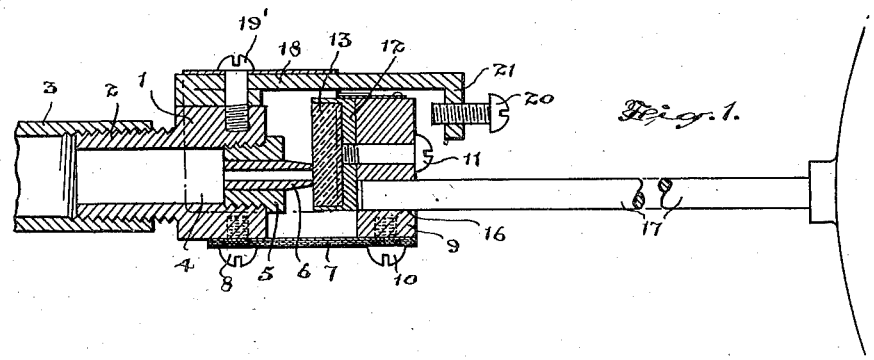
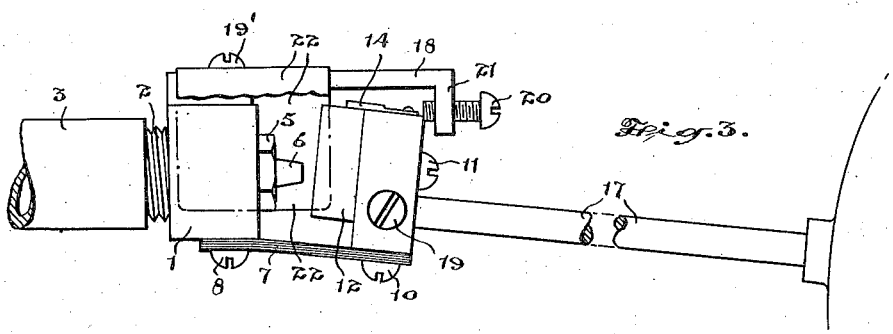
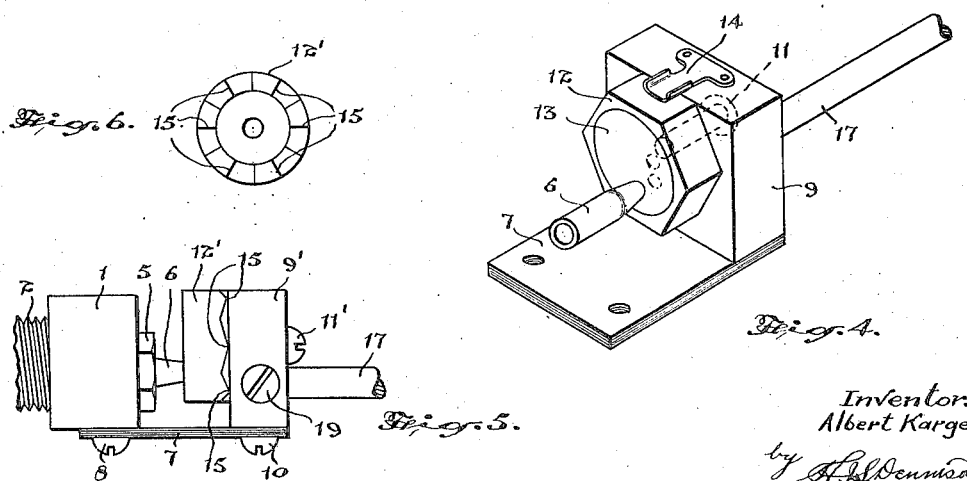
Inventor.
Albert Karges.

Patented Nov. 3, 1936

2,059,359

UNITED STATES PATENT OFFICE 2,059,359

FLOAT VALVE

Albert Karges, Woodstock, Ontario, Canada

Application July 11, 1934, Serial No. 734,586

3 Claims. (Cl. 137—104)

The principal object of this invention is to provide an improved form of float-operated valve which will have long life and will be dependable in operation and which will not be detrimentally affected by corrosion or scale deposits.

The principal feature of the invention resides in the novel construction and arrangement of parts whereby the movable valve element and float arm are mounted on a common spring-supported member to swing bodily in unison to effect the opening and closing of the valve.

A further and important feature resides in the novel manner of supporting a disc valve in eccentric relation to the supply outlet against which it seats, the disc valve being rotatably mounted to periodically provide a fresh seating area.

In the drawing, Figure 1 is a mid-sectional elevational view through a valve structure constructed in accordance with the present invention.

Figure 2 is a plan view.

Figure 3 is a side elevation view of the structure shown in Figures 1 and 2 showing the valve in open position.

Figure 4 is an enlarged perspective detail of the adjustably mounted valve disc showing a spring means for holding the valve in an adjusted position.

Figure 5 is a fragmentary elevational view illustrating a modified form of adjustable valve disc mounting.

Figure 6 is a rear elevational view of the valve disc shown in Figure 5.

Many improvements have been made in valve structures from time to time, but trouble was often experienced after the valve had been in service for a period of time due in part to looseness or play developing between the various relatively movable parts, throwing the valve out of adjustment, and due in many cases to the presence of grit or scale deposits which tend to form on such parts so that an uncertain or binding action is frequently set up.

The present invention has been devised to overcome these difficulties and to provide a form of valve structure which will operate very smoothly and efficiently with the minimum of attention.

In the form of the structure shown in the drawing, the valve body 1 is here shown as of squared formation having a threaded boss 2 for threaded engagement with a water supply pipe 3. A bore 4 extends through the boss and squared portion and a plug member 5 is threaded into the outer end thereof and supports a tubular outlet 6 preferably formed of Monel metal, the outer end thereof being tapered and projecting beyond the head of the plug 5.

A flat spring element 7, preferably formed of laminated spring bronze strips is secured to the under flat face of the valve body 1 by the screws 8, and on the outer free end thereof is mounted a squared metal block 9 by means of the screws 10, the inner surface of the member 9 being spaced a suitable distance from the end extremity of the tubular outlet 6.

A screw 11 extends through the block 9 in offset or eccentric relation to the axis of the tubular outlet 6, preferably at a higher level, and this screw threadedly engages a valve seat retainer 12 axially on the inward side of the block 9 in order to secure the same thereto.

Fitting within the retainer 12 is a valve disc 13, preferably formed of semi-hard rubber composition, and as illustrated in Figures 1 and 4, the valve disc 13 is adapted to seat against the outer tapered end of the tubular inlet 6 at a point out of alignment with the axis of the screw 11.

It is important to note that the eccentric mounting of the valve disc in the manner described provides for the renewal of the seating area periodically by simply rotating the valve disc holder 12 a part revolution about the axis of the screw 11, whereupon a fresh sealing area will be presented to the outer end of the tubular outlet 6.

I preferably form the valve disc holder 12 from hexagon stock, as shown particularly in Figure 4, and a spring element 14 mounted on the upper face of the block 9 is here shown co-operating with the flat peripheral surfaces of the valve disc holder 12 to retain the same in its adjusted position on the block. After the adjustment has been effected the screw 11 may be tightened or the rotatable mounting may be such that it will not be necessary to touch the screw 11 and the adjustment may simply be made by rotating the holder 12 a part revolution, whereupon the spring element will again hold the same in the new position.

Any other desirable form of holding means however may be provided so long as it permits movement of the valve disc holder to present a fresh seating area to the tubular outlet 6, and in the form of the invention illustrated in Figures 5 and 6, I show a valve disc holder 12' formed with a series of peripherally spaced projections 15 on its block-engaging side and co-operating with a corresponding series of depressed areas formed in the block 9', so that by loosening the screw 11' while the valve is held clear of the tubular outlet 6, the valve disc 12' may be rotated a definite distance and again securely locked in this position by tightening the screw 11'.

The block 9 is provided with an orifice 16 to receive the float arm 17 and a screw 19 rigidly secures the arm to the block so that the said block, float arm and disc valve move in unison and float as a body on the outer end of the spring element 7 in a free manner devoid of any frictional resistance so that the valve will be opened and closed with extreme accuracy with the movements of the float arm, there being no possibility of any play between the float arm and the disc valve 13 in operation.

An arm 18 is secured to the upper flat space of the valve body 1 by the screws 19' and this extends over the block 9, and a stop screw 20 is secured in a downward extension 21 thereof and is adapted to limit the opening movement by engagement with the upper edge of the block as illustrated in Figure 3.

A thin strip of metal 22 is secured to the arm 18 by the screws 19' and is turned downwardly at each side to act as a splash guard so that the incoming water impinging on the valve face will not be deflected objectionably.

What I claim as my invention is:—

1. A float valve comprising a valve body having a tubular outlet, a flat spring element secured to said valve body and extending therebeyond, a block secured to the free end of said spring element, said block having an orifice therein, a float having an arm inserted in the orifice of said block, a threaded member rigidly locking said float arm in said block orifice, and a valve member mounted on said block and moving in unison therewith and with said float arm on the flexing of said spring to open and close against said tubular outlet.

2. An improved float valve comprising in combination a pair of blocks spaced apart and presenting flat side surfaces disposed in a substantially common plane, a flat leaf spring disposed in said common plane and secured at its respective ends to said flat side surfaces of said blocks one of said blocks having a tubular outlet and the other having a valve, and a float arm rigidly mounted on said latter block and controlling the flexing of said flat leaf spring into and out of its plane of disposition.

3. An improved float valve comprising in combination a pair of blocks spaced apart and presenting flat side surfaces disposed in a substantially common plane, a flat leaf spring disposed in said common plane and overlapping said flat side surfaces at its respective ends, fastening screws extending through the ends of said flat leaf spring and threaded into the respective blocks to retain all of said elements in co-operative assembled relation, one of said blocks having a tubular outlet and the other having a valve cooperative therewith, and a float arm rigidly secured to said latter block and controlling the flexing of said spring.

ALBERT KARGES.